United States Patent [19]
Izumi et al.

[11] Patent Number: 5,959,724
[45] Date of Patent: Sep. 28, 1999

[54] DISTANCE MEASURING APPARATUS

[75] Inventors: Akio Izumi; Nobuo Hirata; Osamu Sugiyama, all of Nagano; Hideo Shimizu, Tokyo, all of Japan

[73] Assignee: Fuji Electric Co., Ltd., Kawasaki, Japan

[21] Appl. No.: 09/003,129

[22] Filed: Jan. 6, 1998

[30] Foreign Application Priority Data

Jan. 9, 1997 [JP] Japan .................................. 9-001800
Jul. 18, 1997 [JP] Japan .................................. 9-194008

[51] Int. Cl.$^6$ .............................. G01C 3/00; G01C 3/08; G01C 5/00; B60T 7/16
[52] U.S. Cl. ......................... 356/3.14; 180/167; 356/4.02
[58] Field of Search ................. 180/167; 356/3.13–3.16, 356/4.02

[56] References Cited

U.S. PATENT DOCUMENTS 5,233,382  8/1993  Taniguchi et al. .
5,850,254  12/1998  Takano et al. .

*Primary Examiner*—Stephen C. Buczinski
*Attorney, Agent, or Firm*—Kanesaka & Takeuchi

[57] ABSTRACT

A distance measuring apparatus of the invention includes an arithmetic operation device which uses the degree of shift detected when the distance to a reference object is measured and a known distance to the reference object, to determine the difference between the offsets of image-forming positions on optical sensor arrays caused by a windshield present between a measuring object and the optical sensor arrays. The arithmetic operation device uses the difference between the offsets of the image-forming positions, an optical characteristic amount of the image-forming lenses, and the amount of shift detected when the distance to the measuring object is measured, to determine the distance to the measuring object.

16 Claims, 9 Drawing Sheets

DISTANCE MEASURING APPARATUS

BACKGROUND OF THE INVENTION AND RELATED ART STATEMENT

The present invention relates to a distance measuring apparatus, such as an inter-vehicle distance measuring apparatus that is used to prevent collisions between vehicles.

A conventional inter-vehicle distance measuring apparatus electrically compares images formed by two lateral optical systems to measure a distance based on the principle of triangulation.

Figure 6:
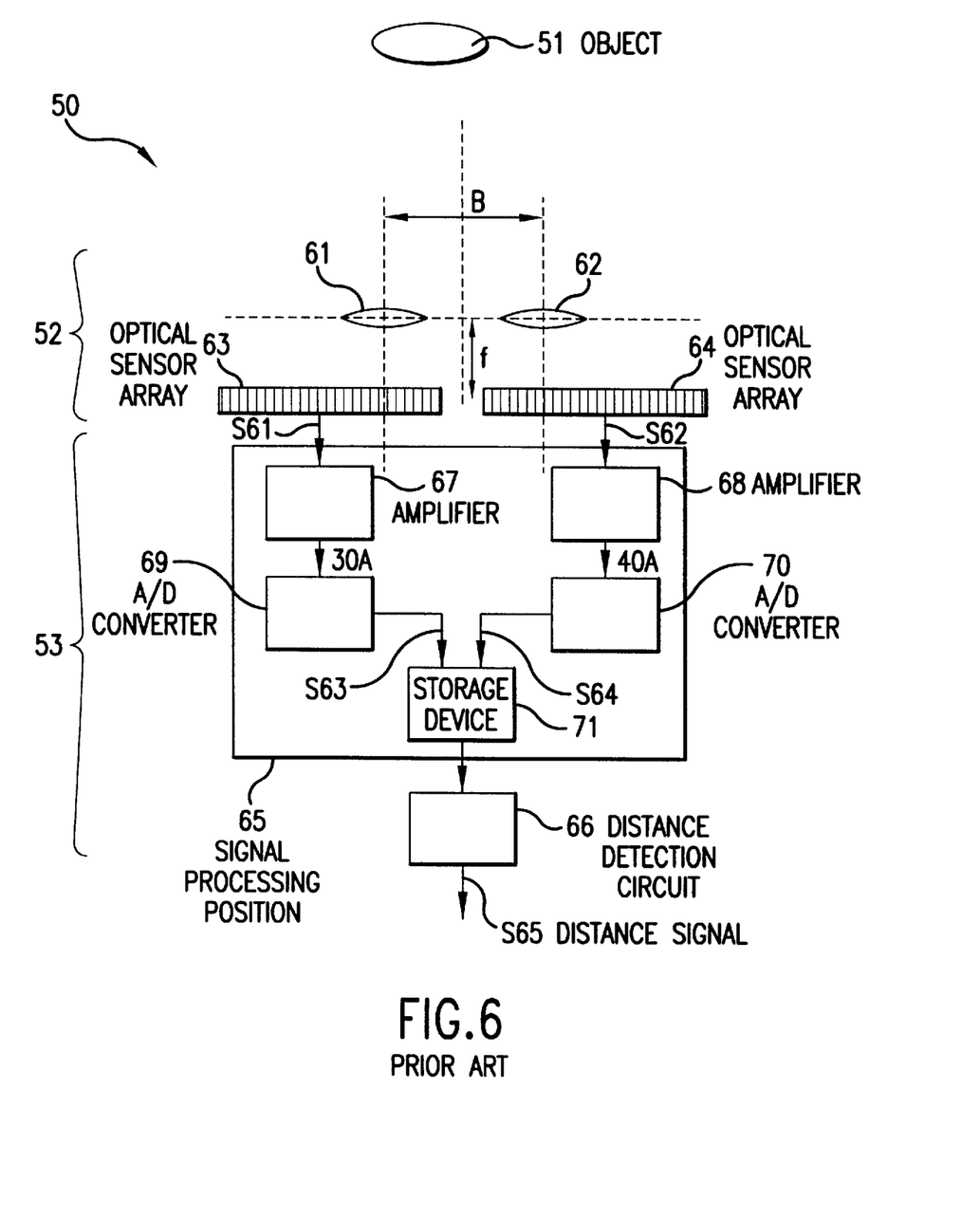
FIG. 6 shows a configuration of a conventional inter-vehicle distance apparatus.

FIG. 6 shows the configuration of a conventional inter-vehicle distance measuring apparatus 50 of this kind, which includes a pair of imaging means 52 for imaging an object 51 to be measured and an arithmetic operation means 53 for calculating the distance to the object 51 based on an image obtained by the imaging means 52.

The imaging means 52 is composed of a pair of image-forming lenses 61, 62 and a pair of optical sensor arrays 63, 64.

The arithmetic operation means 53 is composed of a signal processing section 65 and a distance detection circuit 66.

In FIG. 6, the image-forming lenses 61, 62 are disposed so as to maintain an interval B between their optical axes.

The optical sensor arrays 63, 64 are, for example, CCD linear sensors that are disposed at a focal length (f) from the image-forming lenses 61, 62, respectively.

The optical sensor arrays 63, 64 convert images of the object 51 formed by the image-forming lenses 61, 62 into image signals s61, s62 and output them to the signal processing section 65.

The signal processing section 65 consists of amplifiers 67, 68; A/D converters 69, 70; and a storage device 71.

The image signals s61, s62 from the optical sensor arrays 63, 64 are amplified by the amplifiers 67, 68, converted into digital data by the A/D converters 69, 70, and outputted to the storage device 71 as image data s63, s64.

A distance detection circuit 66 installed on the output side of the signal processing section 65 is composed of a microcomputer to compare the lateral image data s63, s64 stored in the storage device 71 in order to calculate the distance to the measuring object 51. The distance is outputted as a distance signal s65.

Figure 7:
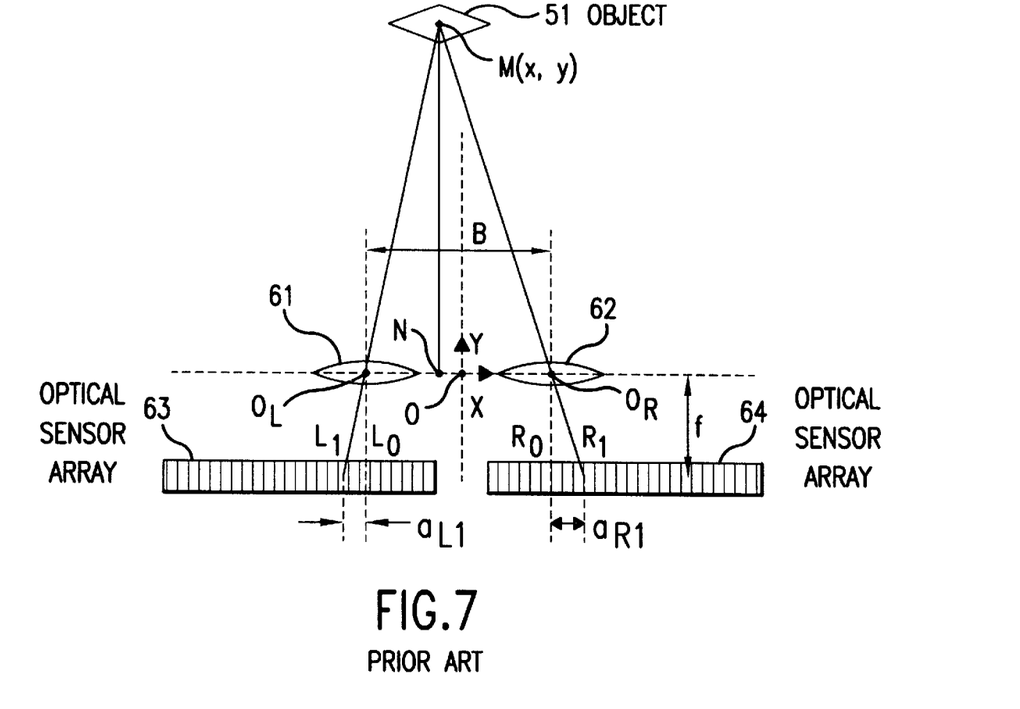
FIG. 7 is a schematic illustration showing the principle of distance calculation.

The principle of the distance calculation is described below with reference to FIG. 7.

In particular, the midpoint between the optical axes of the image-forming lenses 61, 62 is defined as origin O to set a horizontal axis X and a vertical axis Y. The coordinates of image-forming positions $L_1$, $R_1$ are represented as $(-a_{L1}-B/2, -f)$ and $(a_{R1}+B/2, -f)$, respectively. References $a_{L1}$, $a_{R1}$ denote distances on the optical sensor arrays 63, 64, respectively, as shown in the drawing.

If the coordinate of the middle point $O_L$ of the image-forming lens 61 is represented as $(-B/2, 0)$, the coordinate of the middle point $O_R$ of the image-forming lens 62 is represented as $(B/2, 0)$; and the coordinate of a point M in the object 51 is represented as $(x, y)$; then the coordinate of an intersection N of a vertical line extending vertically from the point M to the X axis is $(x, 0)$; the coordinate of a position $L_0$ of a vertical line extending from a point $O_L$ to the optical sensor array 63 is $(-B/2, -f)$; and the coordinate of a position $R_0$ of a vertical line extending from the point $O_R$ to the optical sensor array 64 is $(B/2, -f)$. Since a triangle $MO_LM$ is similar to a triangle $O_L L_1 L_0$ and a triangle $MO_R N$ is similar to a triangle $O_R R_1 R_0$, Equations 1 and 2 are established.

$$(x+B/2)f = a_{L1} \cdot y \qquad \text{Equation 1:}$$

$$(-x+B/2)f = a_{R1} \cdot y \qquad \text{Equation 2:}$$

Equation 3 can be obtained from Equations 1 and 2.

If the distances $a_{L1}$, $a_{R1}$ for the image-forming positions $L_1$, $R_1$ are determined by using Equation 3, the distance (y) to the object 51 can be calculated.

$$y = B \cdot f / (a_{R1} + a_{L1}) \qquad \text{Equation 3:}$$

Next, the operation of the distance detection circuit 66 is described in detail.

Figure 8:
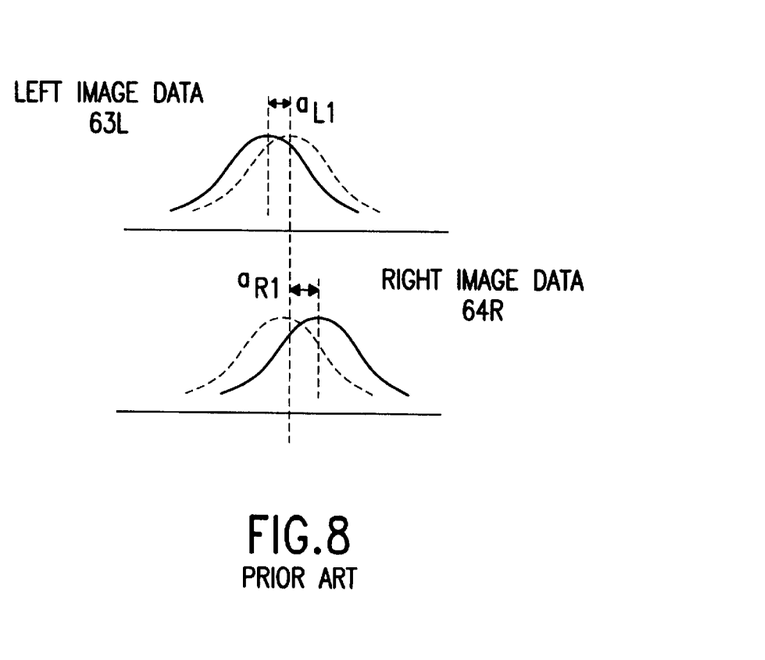
FIG. 8 illustrates the operation of a distance detection circuit.

The distance detection circuit 66 compares lateral data 63L, 63R, as shown by the solid lines in FIG. 8, for a separately set distance measuring range 73 (see FIG. 9); and if the images do not match, for example, it sequentially shifts the left image 63L to the right while shifting the right image 64R to the left, as shown by the broken lines in the figure, in order to detect the amount of shift $(a_{R1}+a_{L1})$ required to place them in a condition where they most nearly match.

The right and left data do not always match perfectly because there may be image matching points located within the spatial pixels of the optical sensor arrays 63, 64.

Based on the amount of shift $(a_{R1}+a_{L1})$, the detection circuit 66 calculates the distance (y) to the object 51 by using Equation 3.

Figures 9, 10:
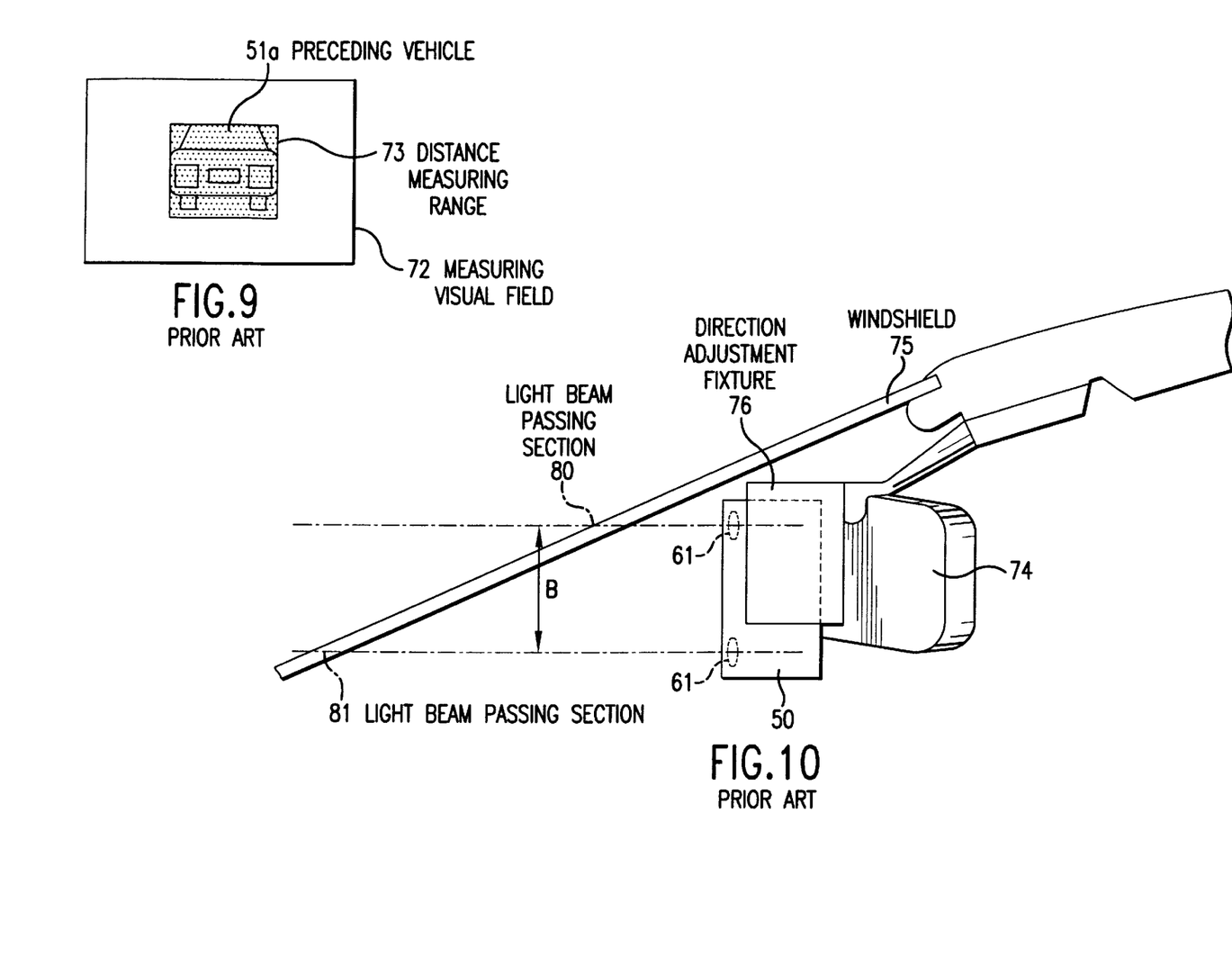
FIG. 9 is a schematic drawing of an image.
FIG. 10 is a schematic illustration showing how an inter-vehicle distance measuring apparatus is installed.

FIG. 9 is a schematic drawing showing a normal image obtained when the inter-vehicle distance to a preceding vehicle 51a is detected.

In this figure, the distance-measuring range 73 is set within a measuring visual field 72, and the distance to an object, that is, the preceding vehicle 51a within the distance measuring range 73, is detected as an inter-vehicle distance based on the principle of the distance detection.

By installing the inter-vehicle distance measuring apparatus 50 inside the vehicle, certain benefits can be obtained including the elimination of need to make this apparatus resistant to dust or water, and the use of a wiper on a rainy day.

FIG. 10 is a schematic sketch showing the inter-vehicle distance measuring device 50 installed between an interior mirror 74 inside the vehicle and a windshield 75.

The inter-vehicle distance measuring apparatus 50 is fixed to the interior mirror 74 via a direction adjustment fixture 76.

Figure 11A:
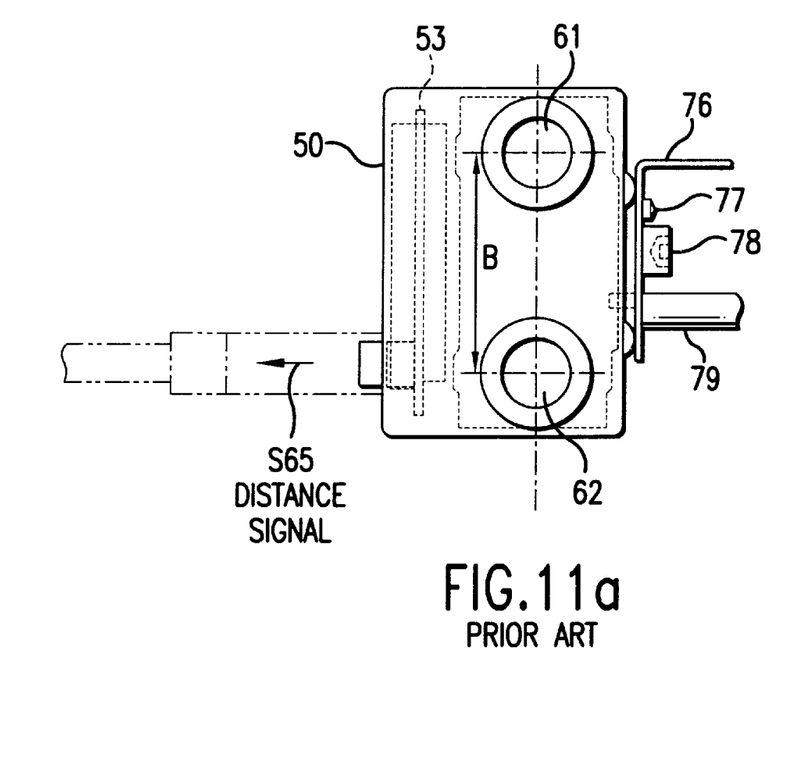
FIGS. 11(a) and 11(b) are schematic illustrations showing an angle adjustment mechanism of the inter-vehicle distance measuring apparatus.
Figure 11B:
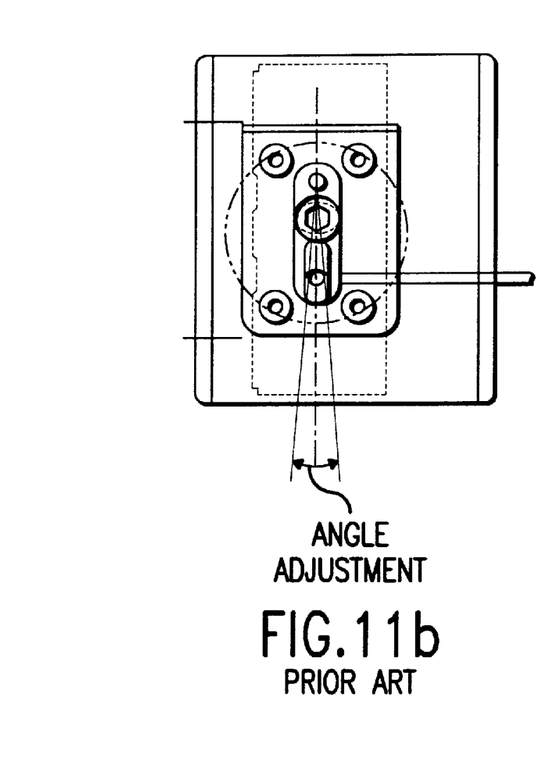

FIG. 11 shows one example of an angle adjustment mechanism for the inter-vehicle distance measuring device 50.

The angle adjustment mechanism is composed of the direction adjustment fixture 76, a parallel pin 77, a fixing bolt 78, and an eccentric driver 79.

The direction adjustment fixture 76 is fixed to a part of the interior mirror (not shown). The angle of the inter-vehicle distance measuring device 50 is adjusted as follows.

The fixing bolt 78 is loosened to rotate the eccentric driver 79. At this point, the inter-vehicle distance measuring apparatus 50 fixed to the direction adjustment fixture 76 can be rotated around the parallel pin 77. The eccentric driver 79 is rotated to adjust the angle (direction) of the inter-vehicle distance measuring apparatus 50, and the fixing bolt 78 is then tightened.

The installation of the inter-vehicle distance measuring apparatus 50 inside the vehicle yields many advantages described above, but also creates inconveniences as described below.

The windshield 75 present between the measuring apparatus 50 and the measuring object 51 causes an error in the distance signal s65, thereby degrading the measuring accuracy of the inter-vehicle distance measuring apparatus 50.

The effects of the windshield 75 include, its non-uniform thickness, the difference in the incident angle of light incident on the image-forming lenses 61, 62, and different refractive indices at different positions of the windshield 75.

Figure 12:
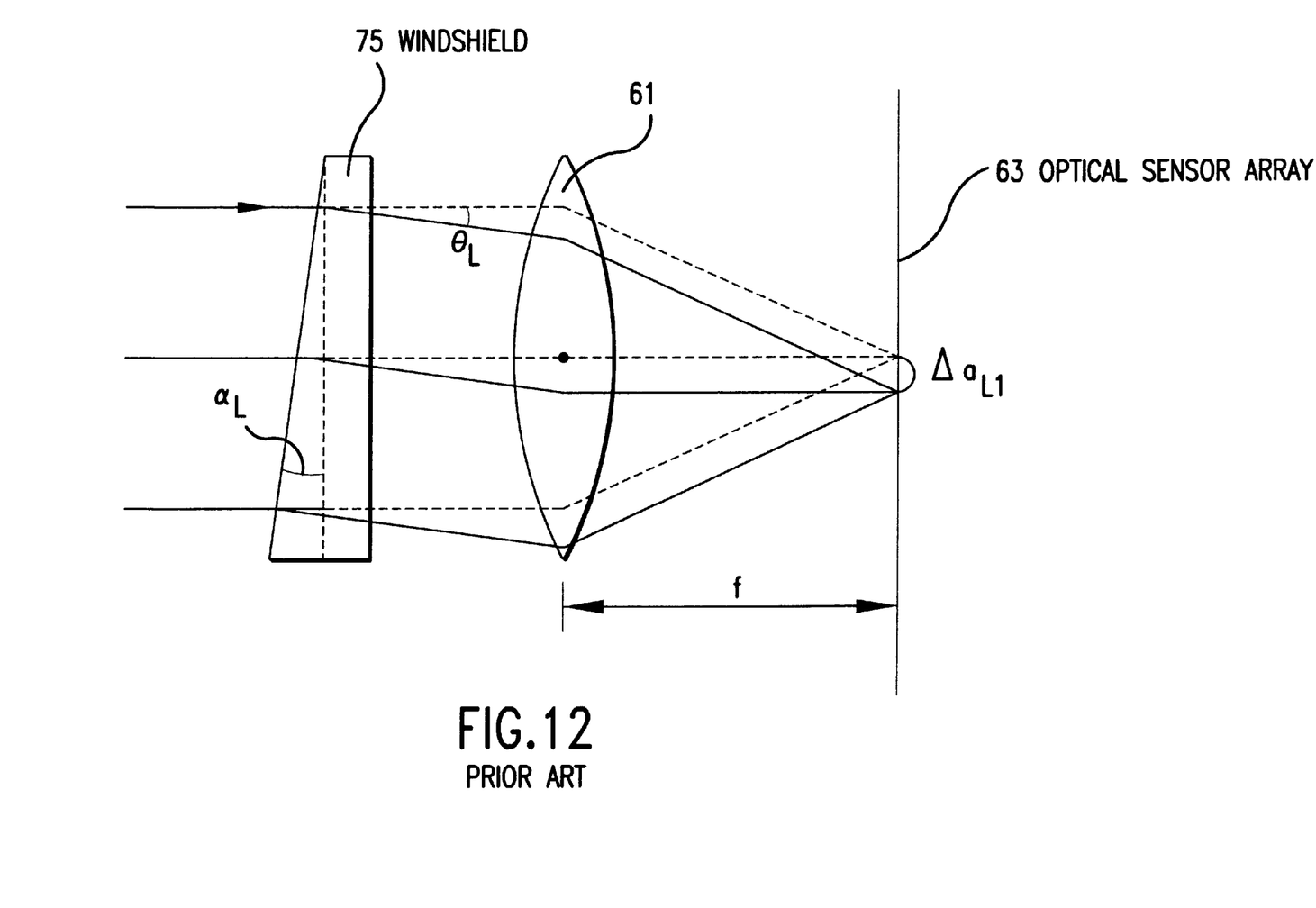
FIG. 12 is a schematic illustration showing the effects of a non-uniform windshield on the distance measuring accuracy.

FIG. 12 shows the effect of the non-uniform thickness of the windshield 75 on the distance measuring accuracy.

For convenience of explanation, in FIG. 12, light beams from infinite points that are parallel to the optical axis of the image-forming lens 61 are transmitted through the windshield 75 with a non-uniform thickness, and enter the imaging means 52 comprising the image-forming lens 61 and the optical sensor array 63. The surface of the windshield 75 (first surface) is assumed to be inclined at an angle $\alpha_L$ from the optical axis of the image-forming lens 61, while the rear surface of the windshield 75 is assumed to be perpendicular to this optical axis.

Light beams from the infinite points that are parallel to the optical axis are refracted on the first and the second surfaces of the windshield 75 and inclined at an angle $\theta_L$ from the optical axis, the angle being given by Equation 4.

$$\theta_L \approx (n-1)\alpha_L \qquad \text{Equation 4:}$$

In this equation, (n) indicates the refractive index of the windshield 75 relative to the wavelength of incident light.

Thus, the position of an image-forming point on the optical sensor array 63 is offset by $\Delta a_{L1}$, which is given by Equation 5, from the image-forming position (as shown by the dotted line) obtained if the windshield 75 does not exist.

$$\Delta a_{L1} = \theta_L \cdot f \qquad \text{Equation 5:}$$

In this equation, (f) designates the focal length of the image-forming lens 61.

One of the image-forming lenses 61 and one of the optical sensor arrays 63 constituting the imaging means 52 have been described, but the same is applicable to the other image-forming lens 62 and the other optical sensor array 64.

A light beam transmitted through the windshield 75 is assumed to be inclined at an angle $\theta_R$ from the optical axis of the image-forming lens 62 and the offset of the image-forming position of this beam on the optical sensor array 64 (from the image-forming position obtained if the windshield does not exist) is represented as $\Delta a_{R1}$.

As is apparent from FIG. 10, the inclination of the normal of each surface of the windshield from incident beams is relatively large as compared to FIG. 12.

In addition, since the two image-forming lenses 61 and 62 are separated at a distance B, light beams incident on each image-forming lens are transmitted through different positions 80, 81, i.e. light beam passing portions, of the windshield 75. Consequently, the thickness of the windshield 75 and the angle between each incident light and the normal of the windshield are different between the positions 80, 81.

As a result, $\Delta a_{L1}$ and $\Delta a_{R1}$ have different values and $\theta_L$ and $\theta_R$ have different values.

The difference between the offsets of the image-forming positions ($\Delta a_{L1}$ and $\Delta a_{R1}$) is given by Equation 6.

$$\Delta a = \Delta a_{L1} - \Delta a_{R1} = f(\theta_L - \theta_R) \qquad \text{Equation 6:}$$

The value of $\Delta a$ given by Equation 6 is an error in the amount of shift and thus an error in the distance signal s65.

This invention thus provides a distance measuring apparatus with a high degree of distance measuring accuracy that can correct errors in distance measurements caused by a medium, such as a windshield present between the distance measuring apparatus and an object to be measured.

SUMMARY OF THE INVENTION

According to the first aspect of the invention, a distance measuring apparatus comprises imaging means including a pair of image-forming lenses and a pair of optical sensor arrays; and arithmetic operation means for calculating the distance to an object to be measured, i.e. measuring object, by using two images of the object obtained by the imaging means based on the principle of triangulation. The arithmetic operation means uses an amount of shift detected when the distance to a reference object is measured and a known distance to the reference object to determine the difference between the offsets of image-forming positions on the optical sensor arrays caused by a medium present between the object to be measured and the optical sensor arrays. The distance to the object is obtained by using the difference between the offsets of the image-forming positions and the amount of shift detected when the distance to the object is measured.

According to the second aspect of the invention, the arithmetic operation means uses the amount of shift detected when the reference object is located at two or more positions different in distances from each other, and a known distance to the reference object to determine the difference between the offsets of the image-forming positions on the optical sensor arrays caused by the medium present between the object to be measured and the optical sensor arrays. By using the difference between the offsets of the image-forming positions and the amount of shift detected when the distance to the measuring object is measured, the distance to the measuring object is determined.

According to the third aspect of the invention, the reference object is a collimator comprising a collimator lens and a chart disposed at a focal position of the collimator lens. The arithmetic operation means uses the amount of shift detected from an image of the chart and the amount of shift detected when the distance to the measuring object is measured, to determine the distance to the measuring object.

According to the fourth aspect of the invention, the reference object is a collimator comprising a collimator lens and a chart disposed at a predetermined distance from the focal position of the collimator lens. The arithmetic operation means uses the distance from the focal position of the chart and the focal length of the collimator lens to determine a pseudo distance from the chart. By using the pseudo distance from the chart, the amount of shift detected from an image of the chart, and the amount of shift detected when the distance to the measuring object is measured, the distance to the measuring object is determined.

According to the fifth aspect of the invention, the reference object is a collimator comprising a collimator lens, a chart that can be moved along the optical axis of the collimator lens from the focal position of the collimator lens, and measuring means for detecting the amount of movement of the chart. The chart is moved along the optical axis of the collimator lens, and the arithmetic operation means uses the amount of the movement of the chart obtained by the measuring means and the focal length of the collimator lens to determine a pseudo distance to the chart. By using the pseudo distance to the chart, the amount of shift detected from an image of the chart, and the amount of shift obtained when the distance to the measuring object is measured, the distance to the measuring object is determined.

According to the sixth aspect of the invention, the collimator includes a finder having an optical axis identical with or parallel to that of the collimator.

According to the seventh aspect of the invention, the finder is disposed so as to be focused at a predetermined finite distance.

According to the eighth aspect of the invention, the finder has a focus adjustment mechanism.

According to the ninth aspect of the invention, the collimator includes a finder having an optical axis identical to that of the collimator, and the finder adjusts the focus by moving the collimator lens along the optical axis of the collimator lens.

According to the tenth aspect of the invention, the distance measuring apparatus has a direction adjustment mechanism for adjusting the mounting angle of the apparatus so that an image of the reference object is formed at predetermined positions on the optical sensor arrays.

According to the eleventh aspect of the invention, the apparatus includes a finder having an optical axis parallel to the optical axis of the image-forming lens.

According to the twelfth aspect of the invention, the finder is detachable.

DETAILED DESCRIPTION OF PREFERRED EMBODIMENTS

Figure 1:
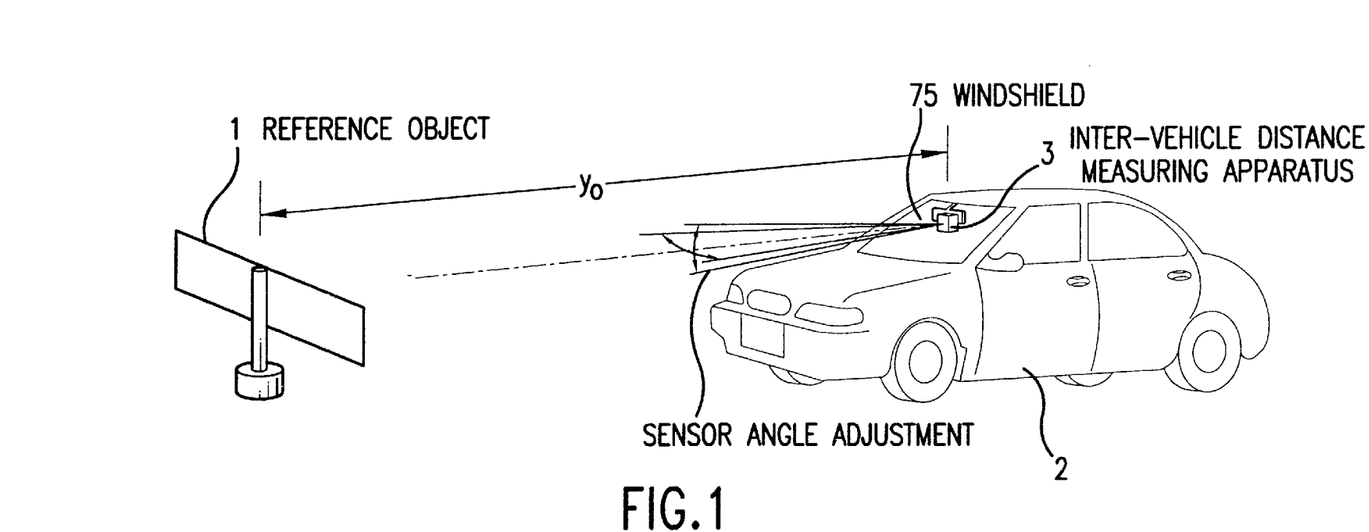
FIG. 1 is a schematic illustration of a first embodiment of this invention.

FIG. 1 is a schematic illustration of a first embodiment of this invention.

First, a reference object 1 is located at a distance $y_0$ from a distance measuring apparatus mounted inside a vehicle 2.

The reference object is a chart. The pattern of the chart includes a chart 1a in which a single horizontal white line is drawn on a black visual field, a chart 1b in which a single diagonal white line is drawn on a black visual field, and a chart 1c in which three horizontal black lines are drawn on a white visual field.

Next, it is confirmed that an image of the reference object 1 is formed on the optical sensor arrays 63, 64 of the inter-vehicle distance measuring apparatus 3.

The optical and electrical configuration of the inter-vehicle distance measuring apparatus 3 is almost the same as shown in FIG. 6, so the following description uses the reference numerals in FIG. 6 as required.

Following the procedure described in the prior art, the distance to the reference object 1 is measured, and an amount of detected shift is represented as $a_0$ (corresponding to $a_{R1}+a_{L1}$ in Equation 3 obtained when the distance to the reference object is measured).

The distance detection circuit 66 stores a preset distance $y_0$ between the measuring apparatus 3 and the reference object 1 as well as the amount of detected shift $a_0$ when the distance to the reference object 1 is measured.

According to this embodiment, the distance $y_0$ and shift amount $a_0$ are used to correct errors in distance measurements caused by the windshield 75.

The correction of errors in the distance measurements is described below.

The offsets of the image-forming positions on the optical sensor arrays caused by the windshield 75 are represented as $\Delta a_R$ and $\Delta a_L$ and the amount of detected shift including the offset is represented as (a).

The accurate distance (y) between the inter-vehicle distance measuring apparatus 3 and the object to be measured, i.e. measuring object, 51 is given by Equation 7 when the offset of the image-forming position caused by the windshield 75 is considered.

$$y = \frac{B \cdot f}{a + \Delta a} \qquad \text{Equation 7:}$$

In Equation 7, $\Delta a$ denotes the difference between the offsets of the image-forming positions ($\Delta a_R - \Delta a_L$), which is the error amount in distance measurements. Reference B designates the distance between the optical axes of the image-forming lenses 61 and 62, and (f) is the focal length of the image-forming lenses 61 and 62. The distance B between the optical axes and focal length (f) generally have designed values. By measuring (y) using separate measuring means, the values of B and (f) can be calculated by using Equation 7. Thus, in Equation 7, the accurate distance (y) between the inter-vehicle distance measuring apparatus 3 and the measuring object 51 can be determined by determining $\Delta a$.

According to this embodiment, the difference $\Delta a$ between the offsets of the image-forming positions is determined by using the distance $y_0$ and shift amount $a_0$ obtained when the distance to the reference object 1 is measured.

As a result, Equation 8 is derived from Equation 7.

Based on Equation 8, the distance detection device 66 determines the accurate distance (y) between the inter-vehicle distance measuring apparatus 3 and the measuring object 51 to detect it as the distance signal s65.

$$y = \frac{1}{\frac{a-a_0}{B \cdot f} + \frac{1}{y_0}}$$ Equation 8:

In Equation 8, (a) is an amount of shift detected when the distance to a general measuring object 51 such as a preceding car is measured.

A second embodiment is described which is similar to the first embodiment, wherein the direction of the inter-vehicle distance measuring apparatus 3 is adjusted by the direction adjustment mechanism (see FIG. 11) of the inter-vehicle distance measuring apparatus 3, so that an image of the reference object 1 disposed at the predetermined position can be formed at predetermined positions on the optical sensor arrays 63, 64 of the inter-vehicle distance measuring apparatus 3.

The direction of the inter-vehicle distance measuring apparatus 3 is adjusted so that an image of the reference object 1 is formed almost at the center of each of the optical sensor arrays 63, 64.

The procedure for adjusting the direction is the same as described in the prior art.

This embodiment is particularly useful when the viewing angle of the imaging means 52 is small.

Figure 2:
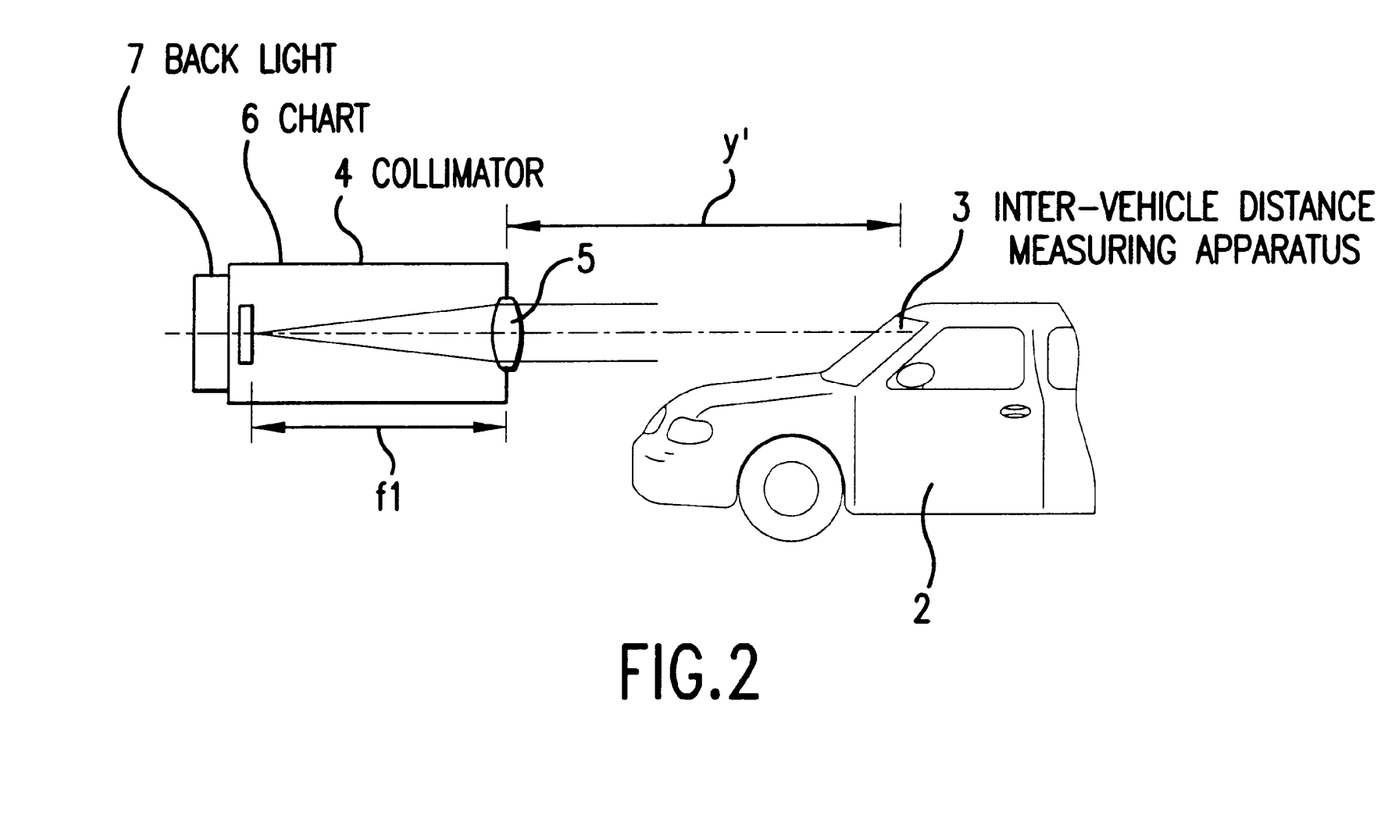
FIG. 2 is a schematic illustration of a third embodiment of this invention.

FIG. 2 is a schematic illustration of a third embodiment of this invention. According to the third embodiment, a collimator 4 is used as the reference object 1. The collimator may be located at an arbitrary position for the reason described below.

As is well known, the collimator 4 includes a collimator lens 5 with a focal length $f_1$ and a chart 6 disposed at the focal position of the lens. Illuminating means for the chart 6 may be a natural light or a back light 7 that illuminates the chart 6 from the direction opposite to the collimator lens.

Since the chart 6 is located on a quasi-plane of the collimator lens 5, the chart 6 of the collimator 4 is located at an infinite point relative to the inter-vehicle distance measuring apparatus 3. Thus, the actual distance between the inter-vehicle distance measuring apparatus 3 and the collimator 4 may be arbitrary.

The procedure for measuring the distance according to this embodiment is almost the same as in the first embodiment.

This procedure differs from the procedure according to the first embodiment in that the distance $y_0$ between the inter-vehicle distance measuring apparatus 3 and the reference object 1 need not be measured and that the accurate distance (y) between the inter-vehicle distance measuring apparatus 3 and a general measuring object 51 is measured using Equation 9 instead of Equation 8.

$$y = B \cdot f / (a - a')$$ Equation 9:

In Equation 9, a' indicates an amount of shift obtained when the distance is measured by using the collimator 4 as the reference object 1, whereas (a) denotes an amount of shift obtained when the distance to the general measuring object 51 is measured. B and (f) are similar to those in Equation 7.

Adjustment of the direction of the inter-vehicle distance measuring apparatus 3, as shown in the second embodiment, is also effective for this embodiment.

FIG. 3 is a schematic illustration of a fourth embodiment of this invention.

Figure 3A:
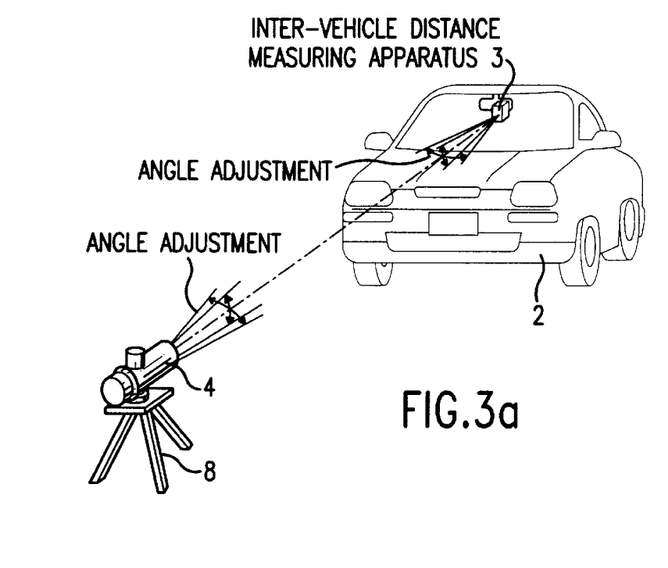
FIG. 3(a) is a schematic illustration of a fourth embodiment of this invention.

The fourth embodiment is similar to the third embodiment, wherein a finder is added to the collimator 4 to adjust its direction.

The collimator 4 is mounted on a tripod 8 that is disposed in a predetermined direction relative to the vehicle 2 as shown in FIG. 3(*a*). The collimator 4 includes a finder 10*a* coaxial with the optical axis of the collimator lens 5 and a half mirror 11 for guiding light beams, which have been transmitted through the collimator lens 5 to the finder 10*a*, as shown in FIG. 3(*b*).

Figure 3B:
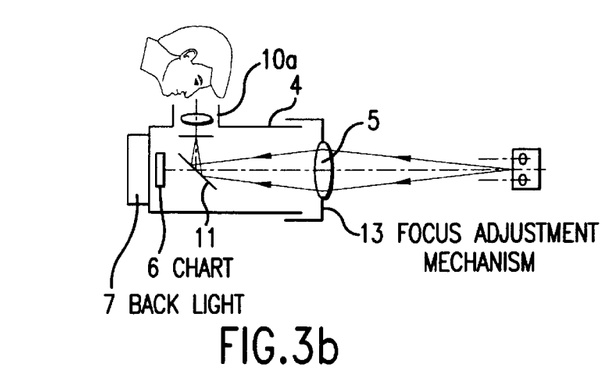
FIGS. 3(b) and (c) show a distance measuring procedure for a conventional collimator with a finder.
Figure 3C:
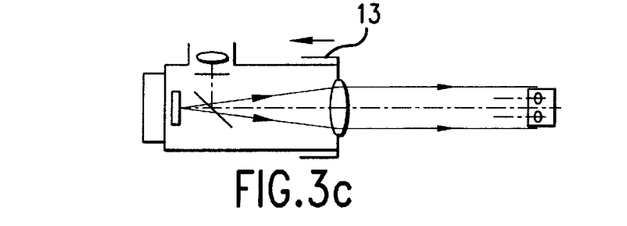

The distance measuring procedure according to the fourth embodiment is described with reference to FIGS. 3(*b*) and (*c*). An observer looks through the finder 10*a* and uses a focus adjustment mechanism 13 to move the collimator lens 5 along the optical axis in order to adjust the focus (FIG. 3(*b*)), and sets the direction of the collimator 4 by adjusting the tripod 8 so that an image of the inter-vehicle distance measuring apparatus 3 installed in the vehicle 2 is formed in the middle of the visual field of the finder 10*a*.

While the direction of the collimator 4 is held, the focus adjustment mechanism 13 is used to fix the collimator at a predetermined position in such a way that an image of the chart from the collimator lens 5 is located at an infinite point (FIG. 3(*c*)).

This procedure is used for a conventional collimator with the focus adjustment mechanism 13 provided in the collimator lens 5, wherein when the collimator lens 5 is set so that an image of the chart is located at an infinite point, the direction of the collimator 4 may become incorrect or the chart image may be offset from an infinite point, resulting in degraded distance measuring accuracy.

It is thus desirable to use the second embodiment comprising the collimator with a finder shown in FIG. 3(*d*) in order to adjust the direction of the collimator.

Figure 3D:
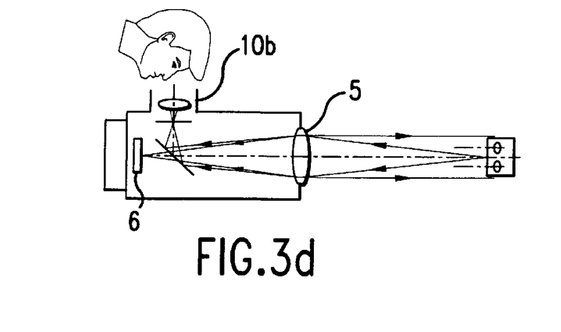
FIG. 3(d) shows a second embodiment of a collimator with a finder.

The finder 10*b* is set so as to be focused at a preset finite distance, i.e. distance between the collimator 4 and the inter-vehicle distance measuring apparatus 3, while the chart image is set so as to be located at an infinite point using the fixed collimator lens 5.

According to this embodiment, this problem can be solved simply by disposing the collimator 4 at a preset finite distance (collimator is already focused in this condition) and adjusting the tripod 8 so that an image of the inter-vehicle distance measuring apparatus 3 is formed in the middle of the visual field of the finder 10*b* in order to set the direction of the collimator 4.

It is of course possible to add a focus adjustment mechanism, i.e. mechanism for moving an ocular in the finder 10*b* along the direction of the optical axis, to the finder 10*b*.

As described above, after the direction of the collimator 4 has been set, the direction of the inter-vehicle distance measuring apparatus 3 is adjusted following the procedure shown in the second embodiment.

Finally, the accurate distance to the general measuring object 51 is determined according to a third embodiment.

FIG. 3(*e*) shows the third embodiment comprising a collimator with a finder.

Figure 3E:
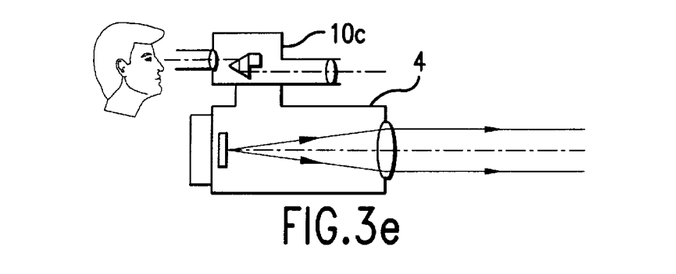
FIG. 3(e) shows a third embodiment of a collimator with a finder.

The finder 10*c* is not coaxial with the optical axis of the collimator lens 5 but has an optical axis parallel thereto.

According to this procedure, the observer first looks through the finder 10*c* and uses a focus adjustment mechanism (not shown) provided in the finder 10*c* in order to adjust the focus, and sets the direction of the collimator 4 by adjusting the tripod 8 so that an image of the inter-vehicle distance measuring apparatus 3 installed in the vehicle 2 is formed in the middle of the visual field of the finder 10*c*.

The direction of the inter-vehicle distance measuring apparatus 3 is then adjusted according to the procedure shown in the second embodiment.

Finally, the accurate distance to the general measuring object 51 is determined according to the third embodiment.

Figures 4A, 4B:
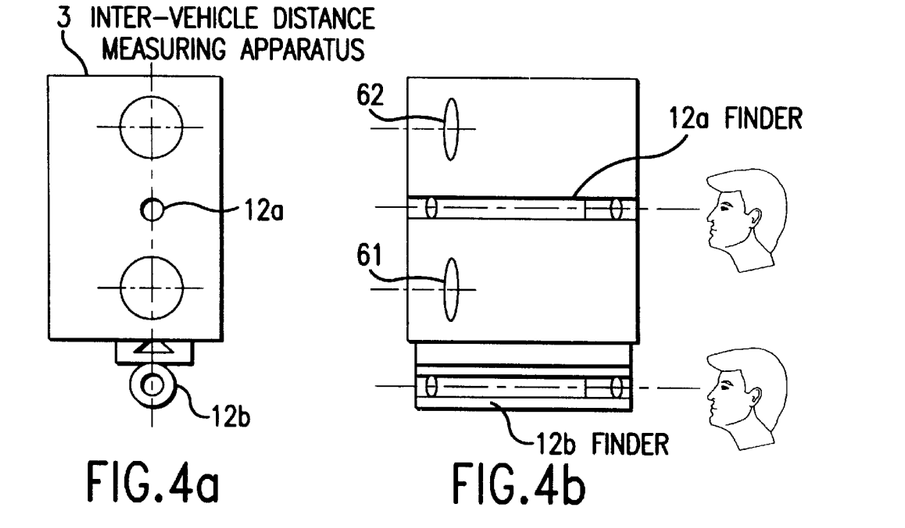
FIGS. 4(a) and 4(b) are schematic illustrations of a fifth embodiment of this invention.

FIGS. 4(a) and 4(b) are schematic illustrations of a fifth embodiment of this invention.

The fifth embodiment provides finders in the inter-vehicle distance measuring apparatus 3. A finder 12a is installed midway between the two image-forming lenses 61, 62 of the inter-vehicle distance measuring apparatus 3 in such a way that the optical axis of the finder 12a is parallel to that of the image-forming lenses.

The observer looks through the finder 12a and adjusts the direction of the inter-vehicle distance measuring apparatus 3 by using the direction adjustment mechanism so that an image of the reference object 1 or the chart 6 of the collimator 4 is formed within the visual field.

The distance measuring procedure is the same as in the first or the third embodiment.

FIGS. 4(a) and 4(b) also show another embodiment of a finder 12b.

The finder 12b is detachable and is disposed under the inter-vehicle distance measuring apparatus 3 in such a way that its optical axis is parallel to those of the image-forming lenses 61, 62. The finder 12b can be removed from the inter-vehicle distance measuring apparatus 3 after measurement by using the reference object 1 or the collimator 4.

The sixth embodiment is similar to the first embodiment, wherein the distance to the reference object 1 is measured when it is disposed at two or more positions different in distances from the inter-vehicle distance measuring apparatus 3.

The case in which the distance to the reference object is measured when it is disposed at two positions different in distances from the apparatus is described below.

For each position, the distance between the inter-vehicle distance measuring apparatus 3 and the reference object 1 is represented as $y_1$ or $y_2$ and the shift amount detected when the distance is measured is represented as $a_1$ or $a_2$. Then, the accurate distance to the measuring object 51 is given by Equation 10.

$$y = \frac{1}{\left(\frac{1}{y_1} - \frac{1}{y_2}\right) \cdot \frac{a - a_1}{a_1 - a_2} + \frac{1}{y_1}}$$

Equation 10:

As is apparent from a comparison between Equation 10 and Equation 8 used in the first embodiment, Equation 10 does not include the distance B between the optical axes of the image-forming lenses 61, 62 and the focal length (f).

Thus, even if the distance B or focal length (f) is different from its designed value, this invention is not affected by this error according to this embodiment using Equation 10.

The distance detection circuit 66 stores the distances $y_1$, $y_2$ between the inter-vehicle distance measuring apparatus 3 and the reference object 1 and the shift amounts $a_1$, $a_2$ detected when the distance is measured, and calculates the distance to the measured object 51 based on Equation 10.

Figure 5:
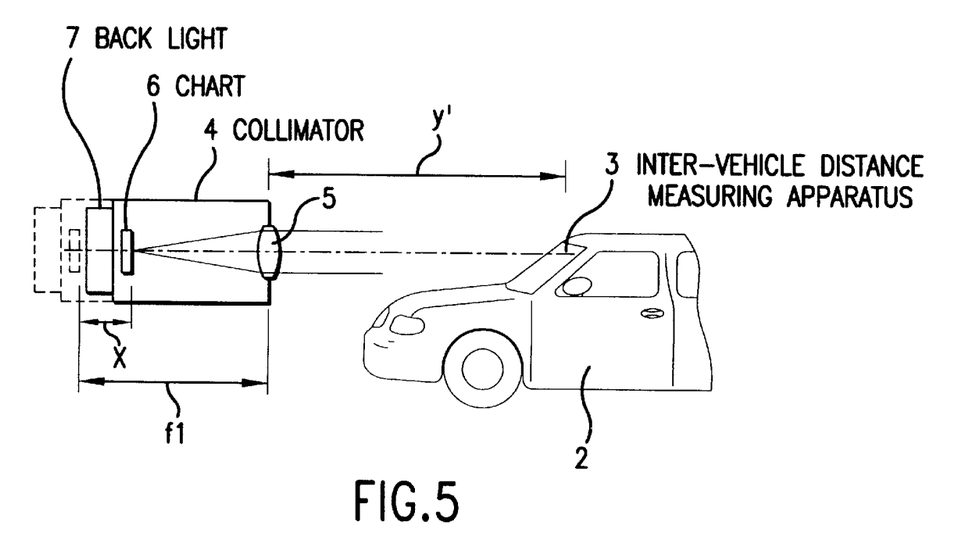
FIG. 5 is a schematic illustration of a seventh embodiment.

FIG. 5 is a schematic illustration of a seventh embodiment of this invention.

The seventh embodiment is characterized in that in the collimator 4 shown in FIGS. 2 and 3, the chart 6 can be moved along the optical axis of the collimator lens 5 so as to measure the distance to the chart 6 when it is disposed at two or more positions different in distances from the apparatus.

According to this embodiment, the movement (x) of the chart 6 from the focal position of the collimator lens 5 must be measured. Measuring means may be, for example, a linear encoder (not shown).

If the movement (x) is negligible compared to the value of the focal length $f_1$ of the collimator lens 5, a distance y" between the collimator lens 5 and a plane on which a virtual image of the chart 6 is formed is given by $(f1)^2/x$.

Furthermore, if the distance y' between the inter-vehicle distance measuring apparatus 3 and the collimator lens (see FIG. 5) is negligible as compared to the distance y" between the collimator lens 5 and a plane on which a virtual image of the chart 6 is formed, the distance y" may be considered to be the distance between the inter-vehicle distance measuring apparatus 3 and the chart 6.

If the above conditions are met, the accurate distance y between the inter-vehicle distance measuring apparatus 3 and the general measuring object 51 can be determined by moving the chart 6 to one, two, or more positions other than the focal position and using Equations 8 or 10 with reference to the shift amount detected at each position and the value y" considered to be the distance between the inter-vehicle distance measuring apparatus 3 and the chart 6.

Although these embodiments have been described in conjunction with the correction of errors caused by the windshield 75 present between the inter-vehicle distance measuring apparatus 3 and the measured object 51, the present invention is not limited to this aspect. If, for example, a window glass is installed in a light receiving section of an enclosure of the inter-vehicle distance measuring apparatus 3, errors caused by the window glass can be corrected to enable the distance to the object 1 to be measured accurately, thereby eliminating the need for expensive and precise glass or plastic plates to reduce costs.

In addition, the inter-vehicle distance measuring apparatus 3 can be used outside the vehicle as a general distance measuring apparatus. If there is no potentially error-causing medium such as a windshield between the distance measuring apparatus and the reference object 1, this invention can evaluate the distance measuring apparatus, i.e. check its accuracy in measuring distances, or calculate the values of B and (f) as described in Equation 8.

As described above, according to the present invention, even if there is a medium, such as a windshield between the distance measuring apparatus and the measuring object, errors in measurements caused by the medium can be corrected to provide a distance measuring apparatus with a high degree of distance measuring accuracy.

Furthermore, as the presence of a medium, such as a windshield, does not affect the distance measuring accuracy, the inter-vehicle distance measuring apparatus can be easily installed inside a vehicle to eliminate the need for a dust and water resistance process without degrading accuracy.

According to another aspect of the invention, as noted above, even if there is an error factor other than the medium present between the distance measuring apparatus and the measuring object, e.g. manufacturing error in the focal length of the image-forming lenses for constituting the distance measuring apparatus, or the distance between the optical axes of the two image-forming lenses is different from its designed value, that error can be corrected to provide a distance measuring apparatus with a higher degree of distance measuring accuracy.

According to a further aspect of the invention, as noted above, the distance between the distance measuring apparatus and the collimator may be arbitrary, so this invention does not require a large space and is convenient to work with.

According to still further aspects of the invention, as noted above, the direction of the distance measuring apparatus can be determined easily and reliably to reduce the burden on the observer in order to provide a distance measuring apparatus with a high degree of distance measuring accuracy.

What is claimed is:

1. A distance measuring apparatus comprising:

imaging logic means including a pair of image-forming lenses and a pair of optical sensor arrays; and arithmetic operation logic means connected to the imaging logic means for calculating a distance to a measuring object to be measured based on two images of the measuring object obtained by the imaging logic means; said arithmetic operation logic means having means to calculate, by using a degree of a shift detected when a distance to a reference object is measured with respect to a known distance to the reference object, a difference between offsets of image-forming positions on the optical sensor arrays caused by a medium present between the measuring object and the optical sensor arrays, and having means to obtain a distance to the measuring object by the difference between the offsets of the image-forming positions and the degree of the shift.

2. A distance measuring apparatus according to claim 1, wherein said arithmetic operation logic means calculates the degree of the shift by locating the reference object at a plurality of positions different in distances from the distance measuring apparatus.

3. A distance measuring apparatus according to claim 1, further comprising direction adjustment means for adjusting a mounting angle of the apparatus so that an image of the reference object is formed at predetermined positions of the optical sensor arrays.

4. A distance measuring apparatus according to claim 1, further comprising a finder having an optical axis parallel to optical axes of the image-forming lenses.

5. A distance measuring apparatus according to claim 4, wherein said finder is detachable.

6. A distance measuring apparatus comprising:

imaging logic means including a pair of image-forming lenses and a pair of optical sensor arrays;

a collimator as a reference object situated away from the imaging logic means and including a collimator lens and a chart disposed near the collimator lens; and arithmetic operation logic means connected to the imaging logic means for calculating a distance to a measuring object to be measured based on two images of the measuring object obtained by the imaging logic means, said arithmetic operation logic means obtaining a distance to the measuring object by a degree of a shift detected from an image of the chart and a degree of a shift detected when a distance to the reference object is measured.

7. A distance measuring apparatus according to claim 6, wherein said chart is located at a focal position of the collimator lens.

8. A distance measuring apparatus according to claim 6, wherein said chart is located at a predetermined distance away from a focal position of the collimator lens, said arithmetic operation logic means calculating, by a length of a focal position of the chart and a focal length of the collimator lens, a distance to the chart and a pseudo distance thereof, and obtaining the distance to the measuring object by the distance to the chart and the pseudo distance thereof together with the degree of the shift detected from the image of the chart and the degree of the shift detected when the distance to the reference object is measured.

9. A distance measuring apparatus according to claim 6, wherein said chart is movable from a focal position of the collimator lens along an optical axis of the collimator lens, said collimator further including measuring means for detecting an amount of movement of the chart; said arithmetic operation logic means calculating, by the amount of movement of the chart obtained from the measuring means and a focal length of the collimator lens, a distance to the chart and a pseudo distance thereof, and obtaining the distance to the measuring object by the distance to the chart and the pseudo distance thereof together with the degree of the shift detected from the image of the chart and the degree of the shift detected when the distance to the reference object is measured.

10. A distance measuring apparatus according to claim 6, wherein said collimator includes a finder having an optical axis at least parallel to an optical axis of the collimator including an identical optical axis.

11. A distance measuring apparatus according to claim 10, wherein said finder is disposed so as to be focused at a predetermined finite distance.

12. A distance measuring apparatus according to claim 10, wherein said finder has focus adjustment means.

13. A distance measuring apparatus according to claim 6, wherein said collimator includes a finder having an optical axis coaxial with an optical axis of the collimator, said finder adjusting a focus by moving the collimator lens along the optical axis of the collimator lens.

14. A distance measuring apparatus according to claim 6, further comprising direction adjustment means for adjusting a mounting angle of the apparatus so that an image of the reference object is formed at predetermined positions of the optical sensor arrays.

15. A distance measuring apparatus according to claim 6, further comprising a finder having an optical axis parallel to optical axes of the image-forming lenses.

16. A distance measuring apparatus according to claim 15, wherein said finder is detachable.

* * * * *

UNITED STATES PATENT AND TRADEMARK OFFICE
CERTIFICATE OF CORRECTION

PATENT NO : 5,959,724

DATED : September 28, 1999

INVENTOR(S): Akio Izumi, Nobuo Hirata, Osamu Sugiyama, Hideo Shimizu

It is certified that error appears in the above-identified patent and that said Letters Patent is hereby corrected as shown below:

```
In column 5, line 28, after "invention;" add --Fig. 1'
        is a chart of a reference object;--, and
In column 6, line 1, after "chart", add --as shown in
        in Fig. 1'--.
```

Signed and Sealed this

Ninth Day of May, 2000

Attest:

Attesting Officer

Q. TODD DICKINSON

Director of Patents and Trademarks